April 18, 1967     B. P. BRODT     3,314,445

LIQUID LEVEL CONTROL DEVICE

Filed Aug. 24, 1964     2 Sheets-Sheet 1

INVENTOR
BURTON PARDEE BRODT

BY *Francis A. Painter*

ATTORNEY

INVENTOR
BURTON PARDEE BRODT

United States Patent Office 3,314,445
Patented Apr. 18, 1967

3,314,445
LIQUID LEVEL CONTROL DEVICE
Burton Pardee Brodt, Wilmington, Del., assignor to E. I. du Pont de Nemours and Company, Wilmington, Del., a corporation of Delaware
Filed Aug. 24, 1964, Ser. No. 391,402
2 Claims. (Cl. 137—396)

This invention relates to liquid level control and more particularly to the control of liquid levels in pressure vessels.

In many processes, e.g., in the production of polymers, there is a need for improving the uniform, automatic control of liquid level in vessels of all sizes over a wide range of pressures. The control of liquid level is even more difficult in systems where there is a tendency for any contained solids to settle or deposit on stagnant surfaces. Various float-type transmitters, pressure transmitters, capacitance probes, and radiation devices have been used for controlling liquid levels, but they are generally complicated or expensive, or non-uniform in operation under varying conditions of temperature, pressure, agitation, or solids concentration, e.g., those which often prevail in polymerization.

It has been found that satisfactory liquid level control can be effected even in highly agitated polymerizations conducted under pressure in the presence of some insoluble material in accordance with this invention which is particularly pointed out in the appended claims and is illustrated in a preferred embodiment in the accompanying drawings wherein:

Figure 1:
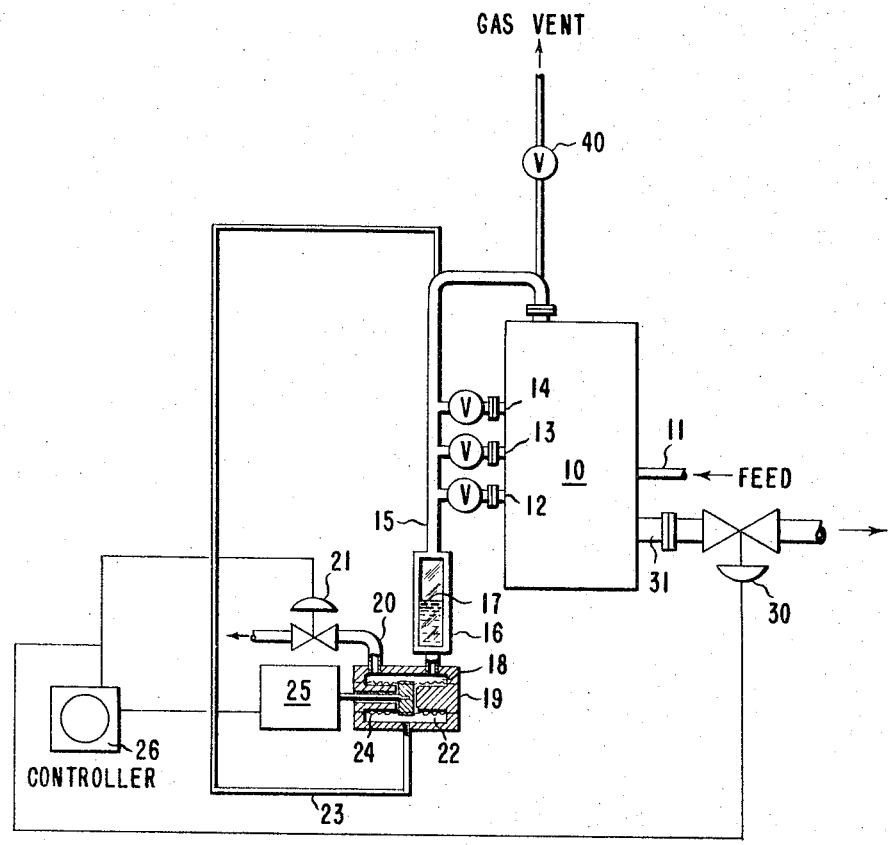
FIGURE 1 is a schematic representation of a liquid level control apparatus in association with a pressure vessel.

Referring now to FIGURE 1, pressure vessel 10 is continuously or intermittently filled through feed line 11 and is equipped with an arbitrary number of valved overflow outlets. In this example, there are three outlets 12, 13, and 14. These outlets can be replaced by a movable standpipe located inside the tank. Depending upon the desired level to be maintained, one of the outlets 12, 13, or 14 is opened and those below it are closed. When the feed liquid rises to the level of the opened outlet, it overflows therethrough into the vertical conduit 15 which is in vapor communication with the vapor space of the vessel 10. The base of vertical conduit 15 has an enlargement 16 which is equipped with a sight glass so that the secondary liquid level 17 which develops therein may be visually observed. The enlargement 16 is hydraulically connected at its base to the high-pressure chamber 18 of a diaphragm means 19. The high-pressure chamber 18 also has an outlet port 20 which leads to an effluent flow regulator valve 21. The low-pressure chamber 22 of diaphragm means 19 has a pressure equalization line 23 in communication with the free space of the vessel 10 and also with the top of the conduit 15. The diaphragm means 19 has a resilient diaphragm element 24 which undergoes slight movement responsive to varying heights of the secondary level 17. These movements are detected by the differential pressure transmitter 25 which will be described in detail hereinafter. The differential pressure transmitter produces an impulse, in this case pneumatic, responsive to movement of the diaphragm element 25; these impulses are sensed by a controller 26 which, in turn, produces suitable actuating impulses to vary the flow through effluent flow regulator valve 21. Suitable differential pressure transmitters, control instruments, and flow regulator valves are well known to those skilled in the art and, as such, are not the subject of this invention. The controller 26 may also be connected to a second effluent flow regulator valve 30 which is located on a conduit 31 emanating from the pressure vessel 10, in order to increase the allowable flow rate of vessel feed to any desirable value.

The illustrated system operates as follows: The feed introduced through line 11 eventually fills vessel 10 to the desired level and the liquid overflows through one of the orifices 12, 13, or 14 into the vertical conduit 15. The valve 21 is either closed or restricted such that the liquid fills the high-pressure chamber 18 and backs up into the enlargement to a secondary level 17. Once an optimum secondary level is determined, the controller 26 is set such that an increase in secondary level will be sensed by the movement of the diaphragm element 24 transmitted to the controller 26 by differential pressure transmitter 25. An appropriate impulse from the controller 26 will open valve 21, thereby permitting flow from the conduit 15 through the diaphragm means 19 and reducing the secondary level 17. To provide for flows larger than may conveniently pass through the differential pressure transmitter 25, the controller 26 may also actuate flow regulator valve 30 which discharges excess liquid directly from the vessel 10.

If a gas is evolved from the surface of the liquid within vessel 10, it may be discharged through back pressure control valve 40.

Figure 2:
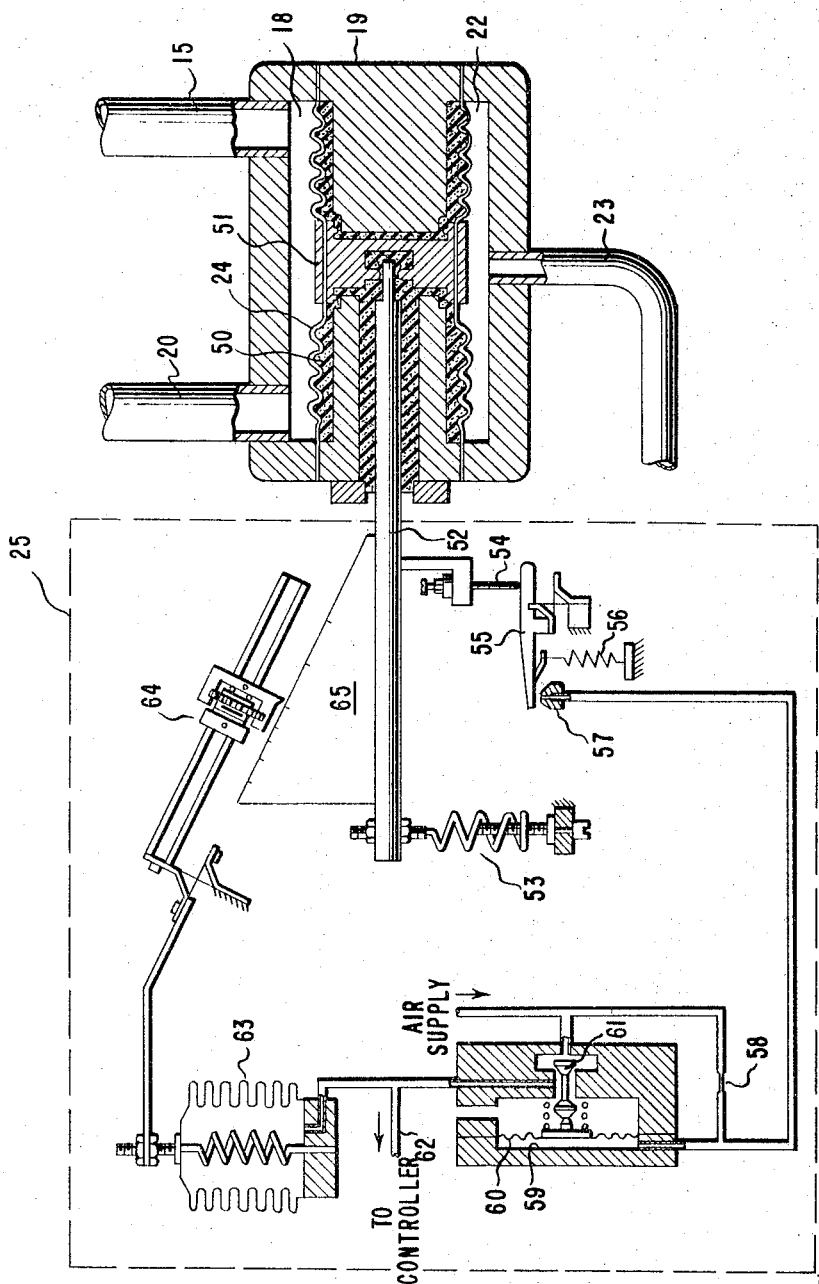
FIGURE 2 is a schematic representation of a differential pressure transmitter and associated diaphragm means for use in this invention.

The differential pressure transmitter 25 employed is a Transcope Differential Pressure Transmitter 214T manufactured by the Taylor Instrument Co., Rochester, N.Y. The construction thereof will be described in relation to FIGURE 2. The resilient diaphragm element embraces sponge rubber portion 50 and has a diaphragm spool 51 at the center. The latter actuates one end of force beam 52 while the other end is held by the zero adjustment means 53. Force beam 52 has an adjustable screw projection 54 which actuates one end of pivotable baffle 55. The other end of baffle 55 is restricted by spring 56 in its movement over nozzle 57. An air supply flows through orifice restriction 58 to nozzle 57 and the back pressure is controlled by the movements of baffle 55. This back pressure is registered in the chamber 59 formed by relay diaphragm 60. Movements of the latter regulate valve 61; when the latter is open, it permits the air flow out of passage 62 to the controller 26. In addition, movements of the relay diaphragm 60 vary the pressure in follow-up bellows 63 which, in turn, changes the force of the span adjustment lever 64 against slide 65 and restores the force beam 52 to its original position, thus restoring equilibrium. By this differential pressure transmitter 25 and diaphragm means 19, the pressure on diaphragm element 24 is converted into a regulated pneumatic impulse flowing from passage 62.

This invention overcomes many of the disadvantages of conventional liquid level control systems. There is no need for a sealing diaphragm to be mounted near the bottom of the vessel 10 and the latter need not be uniformly agitated to prevent deposition of solids. Further, this invention can be used in connection with small or large vessels handling either viscous liquids or those containing a large amount of solids in suspension. Solids buildup is avoided in the diaphragm means by the frequent flushing action provided by the liquid flow through the high pressure chamber. Use of the invention is relatively inexpensive and does not require extraordinary equipment or skills.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In combination with a liquid fed pressure vessel having a free space above the liquid therein, a device for controlling the liquid level in said vessel comprising overflow outlet means connected to said vessel, vertical conduit means connected to said outlet, diaphragm means at the base of said conduit means having a high pressure chamber and a low pressure chamber separated by a resilient diaphragm element, said high pressure chamber being connected both to the base of said conduit means and to an effluent flow regulator, said low pressure chamber being in communication with the free space of said vessel, said diaphragm element being movable responsive to varying liquid levels in said conduit, and control means for regulating the liquid flow through said effluent flow regulator responsive to movements of said diaphragm element.

2. A device as described in claim 1 wherein a second effluent flow regulator is connected to said pressure vessel below said outlet, the flow therethrough being regulated by said control means responsive to movements of said diaphragm element.

References Cited by the Examiner
UNITED STATES PATENTS
2,685,302   8/1954   Holm _____ 137—395

WILLIAM F. O'DEA, *Primary Examiner.*

D. R. MATTHEWS, *Assistant Examiner.*